(12) United States Patent
Kanehiro et al.

(10) Patent No.: US 10,725,355 B2
(45) Date of Patent: Jul. 28, 2020

(54) LIQUID CRYSTAL DISPLAY PANEL

(71) Applicant: Sharp Kabushiki Kaisha, Sakai, Osaka (JP)

(72) Inventors: Masayuki Kanehiro, Sakai (JP); Youhei Nakanishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/333,605

(22) PCT Filed: Sep. 13, 2017

(86) PCT No.: PCT/JP2017/033049
§ 371 (c)(1),
(2) Date: Mar. 15, 2019

(87) PCT Pub. No.: WO2018/056140
PCT Pub. Date: Mar. 29, 2018

(65) Prior Publication Data
US 2019/0212619 A1      Jul. 11, 2019

(30) Foreign Application Priority Data

Sep. 20, 2016   (JP) .................................. 2016-183395

(51) Int. Cl.
*G02F 1/1343*   (2006.01)
*G02F 1/1362*   (2006.01)
(Continued)

(52) U.S. Cl.
CPC ...... *G02F 1/136209* (2013.01); *G02F 1/1337* (2013.01); *G02F 1/13439* (2013.01); *G02F 1/134363* (2013.01); *G02F 1/1362* (2013.01); *G02F 1/133512* (2013.01); *G02F 1/133707* (2013.01); *G02F 2001/133388* (2013.01);
(Continued)

(58) Field of Classification Search
CPC ......... G02F 1/134363; G02F 1/136209; G02F 1/1337
See application file for complete search history.

(56) References Cited

U.S. PATENT DOCUMENTS

2009/0115933 A1    5/2009  Mimura
2010/0289994 A1*  11/2010  Nonaka ............. G02F 1/133514
                                                    349/108
2016/0320646 A1*  11/2016  Lee ...................... G02F 1/1339

FOREIGN PATENT DOCUMENTS

JP    03-009324 A      1/1991
JP    2010-286825 A   12/2010
(Continued)

OTHER PUBLICATIONS

Official Communication issued in International Patent Application No. PCT/JP2017/033049, dated Dec. 5, 2017.

*Primary Examiner* — James A Dudek
(74) *Attorney, Agent, or Firm* — Keating & Bennett, LLP

(57) ABSTRACT

An object of the present invention is to enhance a display quality of a liquid crystal display panel by causing a contour of a display region not to be noticeable. A display region of a liquid crystal display panel (100) includes a normal display region (101*a*) and a boundary display region (101*c*), an image being displayed more darkly in the boundary display region (101*c*), which is in contact with a black light blocking part (101*b*), than in the normal display region (101*a*).

1 Claim, 12 Drawing Sheets

(51) Int. Cl.
*G02F 1/1337* (2006.01)
*G02F 1/1335* (2006.01)
*G02F 1/1333* (2006.01)

(52) U.S. Cl.
CPC ............ *G02F 2001/134372* (2013.01); *G02F 2201/123* (2013.01); *G02F 2201/56* (2013.01); *G02F 2203/30* (2013.01)

(56) References Cited

FOREIGN PATENT DOCUMENTS

| | | |
|---|---|---|
| JP | 2012-242465 A | 12/2012 |
| WO | 2007/132574 A1 | 11/2007 |

* cited by examiner (a)

| PROPORTION (%) OF AREA ON OUTER SIDE OF IDEAL LINE | ANGLE (deg) OF ELECTRODE | GRAY LEVEL OF DISPLAY |
|---|---|---|
| S = 100 | BM | BM |
| 66 ≦ S < 100 | 50 | 157 |
| 43 ≦ S < 66 | 45 | 198 |
| 25 ≦ S < 43 | 35 | 224 |
| 0 < S < 25 | 25 | 243 |
| S = 0 | 15 | 255 |

(b)

LIQUID CRYSTAL DISPLAY PANEL

TECHNICAL FIELD

The present invention relates to a liquid crystal display panel.

BACKGROUND ART

A liquid crystal display panel includes (i) a display region in which an image is displayed and (ii) a light blocking part which is provided on an outer side of the display region. In the display region of the liquid crystal display panel, a plurality of liquid crystal pixels are arranged in a matrix manner. Typically, a conventional liquid crystal display panel has a rectangular outer shape. However, nowadays, liquid crystal display panels, having various outer shapes such as a semicircular shape and a trapezoidal shape, are also produced due to development of a processing technique (Patent Literature 1). Such a liquid crystal display panel is often configured such that a display region also has a shape corresponding to an outer shape of the liquid crystal display panel.

FIG. 12 is a view illustrating a configuration of a conventional liquid crystal display panel 900. As illustrated in FIG. 12, the liquid crystal display panel 900 has an edge 901 having a rounded outer shape. The edge 901 having a rounded outer shape is produced by cutting a corner of the liquid crystal display panel having a rectangular shape. The liquid crystal display panel 900 includes, in the edge 901, (i) a display region 901a and (ii) a light blocking part 901b (black matrix (BM)) which is provided on an outer side of the display region 901a. The light blocking part 901b is constituted by a light blocking member, and therefore does not transmit white light emitted from a backlight. As such, the light blocking part 901b is always black. In the edge 901 of the liquid crystal display panel 900, the display region 901a has a stepwise (zigzag) contour based on a shape and a size of each of liquid crystal pixels 9.

CITATION LIST

Patent Literature

PCT International Publication No. WO2007/132574 (published on Nov. 22, 2007)

SUMMARY OF INVENTION

Technical Problem

In a case where the liquid crystal display panel 900 illustrated in FIG. 12 does not carry out black display, the contour of the display region 901a, which contour is not smooth, is easily visually recognized by a user because there is a contrast in brightness between the display region 901a and the light blocking part 901b. In particular, in a case where white display is carried out in the display region 901a, the contrast becomes greater. Therefore, the contour of the display region 901a, which contour is not smooth, is noticeable.

The present invention has been made in view of the above problem, and an object of the present invention is to enhance a display quality of a liquid crystal display panel by causing a contour of a display region not to be noticeable.

Solution to Problem

In order to attain the above object, a liquid crystal display panel in accordance with an aspect of the present invention is a liquid crystal display panel including: a display region which is constituted by liquid crystal pixels; and a light blocking part which is black and which is provided on an outer side of the display region, the display region including (i) a boundary display region which is in contact with the light blocking part and in which first ones of the liquid crystal pixels are arranged stepwise and (ii) a normal display region which is provided on an inner side of the boundary display region, an image being displayed more darkly in the boundary display region than in the normal display region.

Advantageous Effects of Invention

According to an aspect of the present invention, it is possible to enhance a display quality of a liquid crystal display panel by causing a contour of a display region not to be noticeable.

Figure 2:
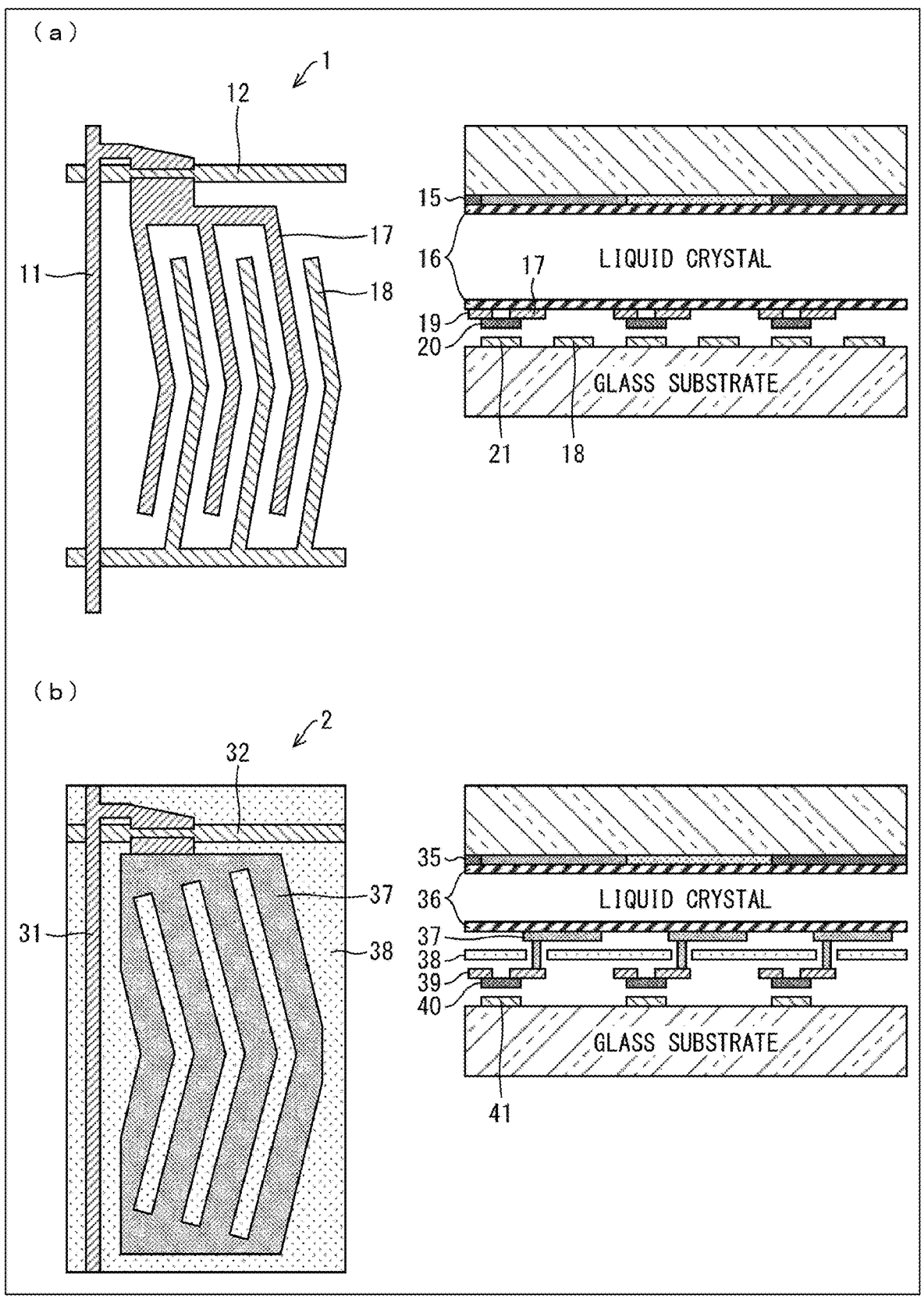

(a) and (b) of FIG. 2 are views each illustrating a configuration of a liquid crystal pixel included in the liquid crystal display panel in accordance with Embodiment 1. (a) of FIG. 2 illustrates a liquid crystal pixel in an IPS mode (In-Plane Switching mode). (b) of FIG. 2 illustrates a liquid crystal pixel in an FFS (Fringe Field Switching) mode.

Figure 3:
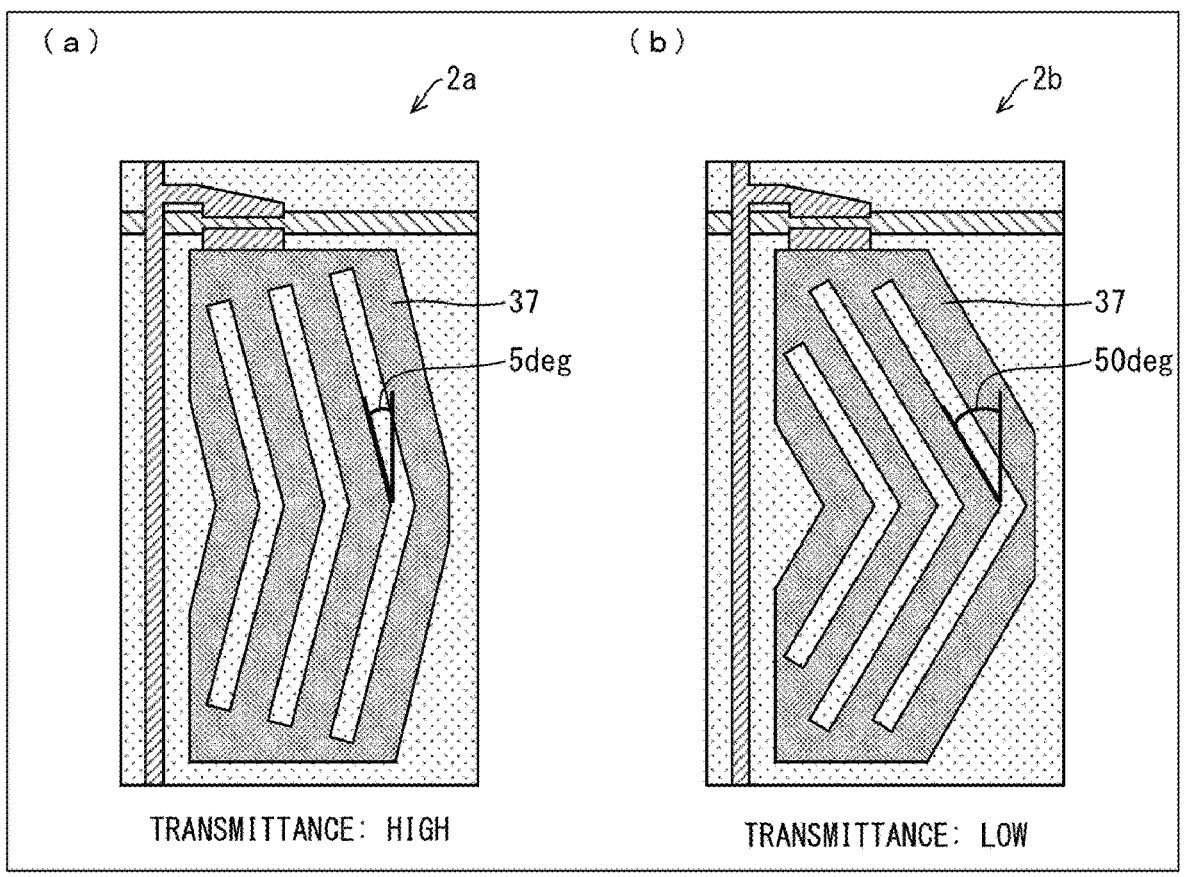

(a) and (b) of FIG. 3 are views each illustrating a configuration of a liquid crystal pixel included in the liquid crystal display panel in accordance with Embodiment 1. (a) of FIG. 3 illustrates a configuration of a liquid crystal pixel having a higher transmittance. (b) of FIG. 3 illustrates a configuration of a liquid crystal pixel having a lower transmittance.

Figure 4:
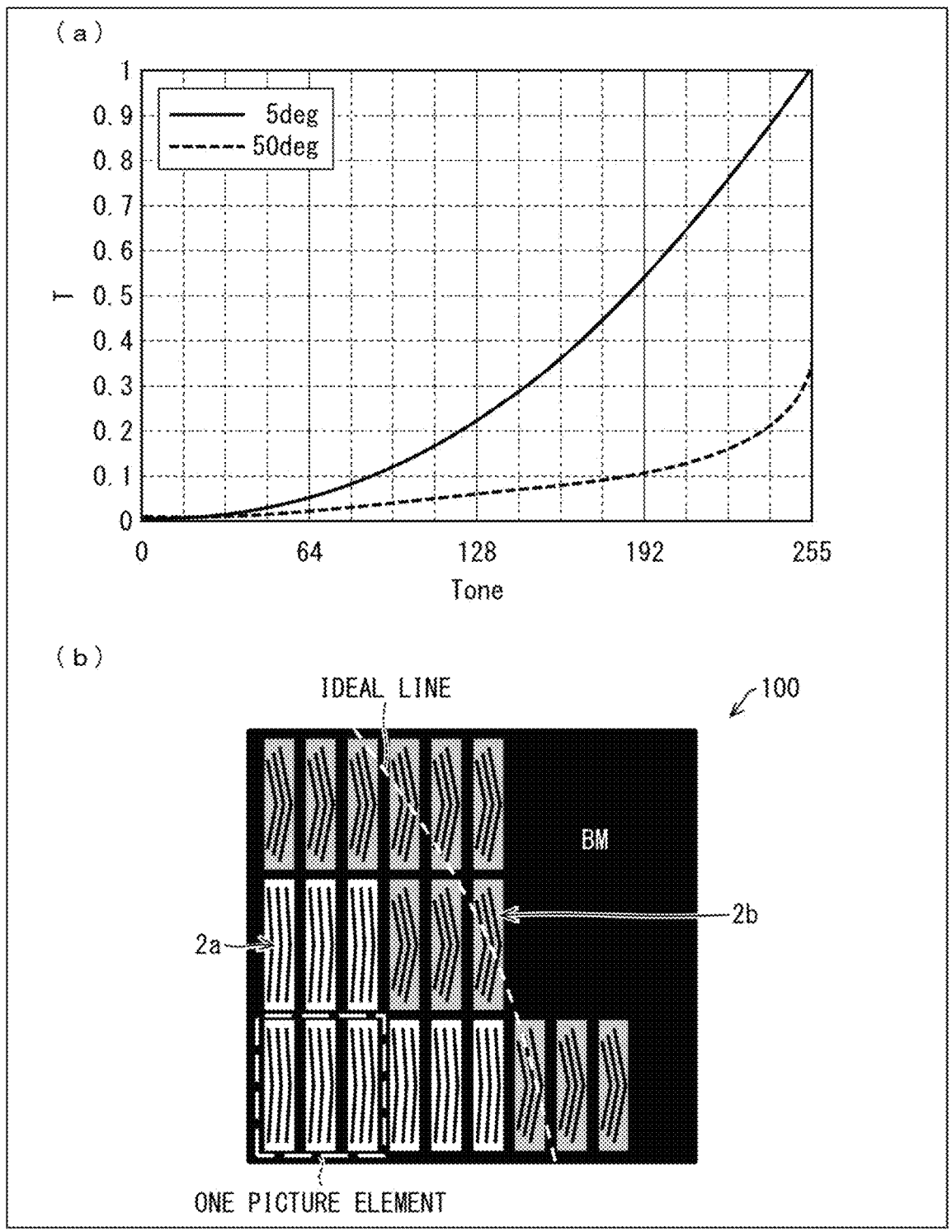

(a) of FIG. 4 is a graph showing, in regard to liquid crystal pixels in accordance with Embodiment 1, correspondence between (i) gray levels of an image and (ii) a transmittance of each of the liquid crystal pixels. (b) of FIG. 4 is a view illustrating disposition of the liquid crystal pixels in the liquid crystal display panel in accordance with Embodiment 1.

Figure 5:
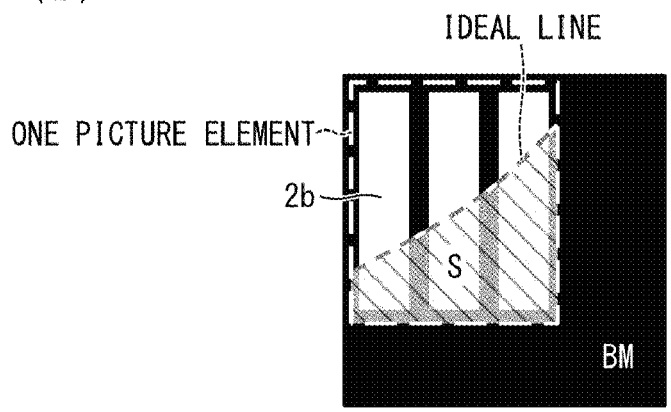

(a) of FIG. 5 is a table showing correspondence between (i) an area of a region of a picture element which region is located on an outer side of a virtual ideal line, (ii) an angle of an electrode included in a liquid crystal pixel which constitutes the picture element, and (iii) a transmittance of the picture element. (b) of FIG. 5 illustrates the area of the region of the picture element which region is located on the outer side of the ideal line.

Figure 6:
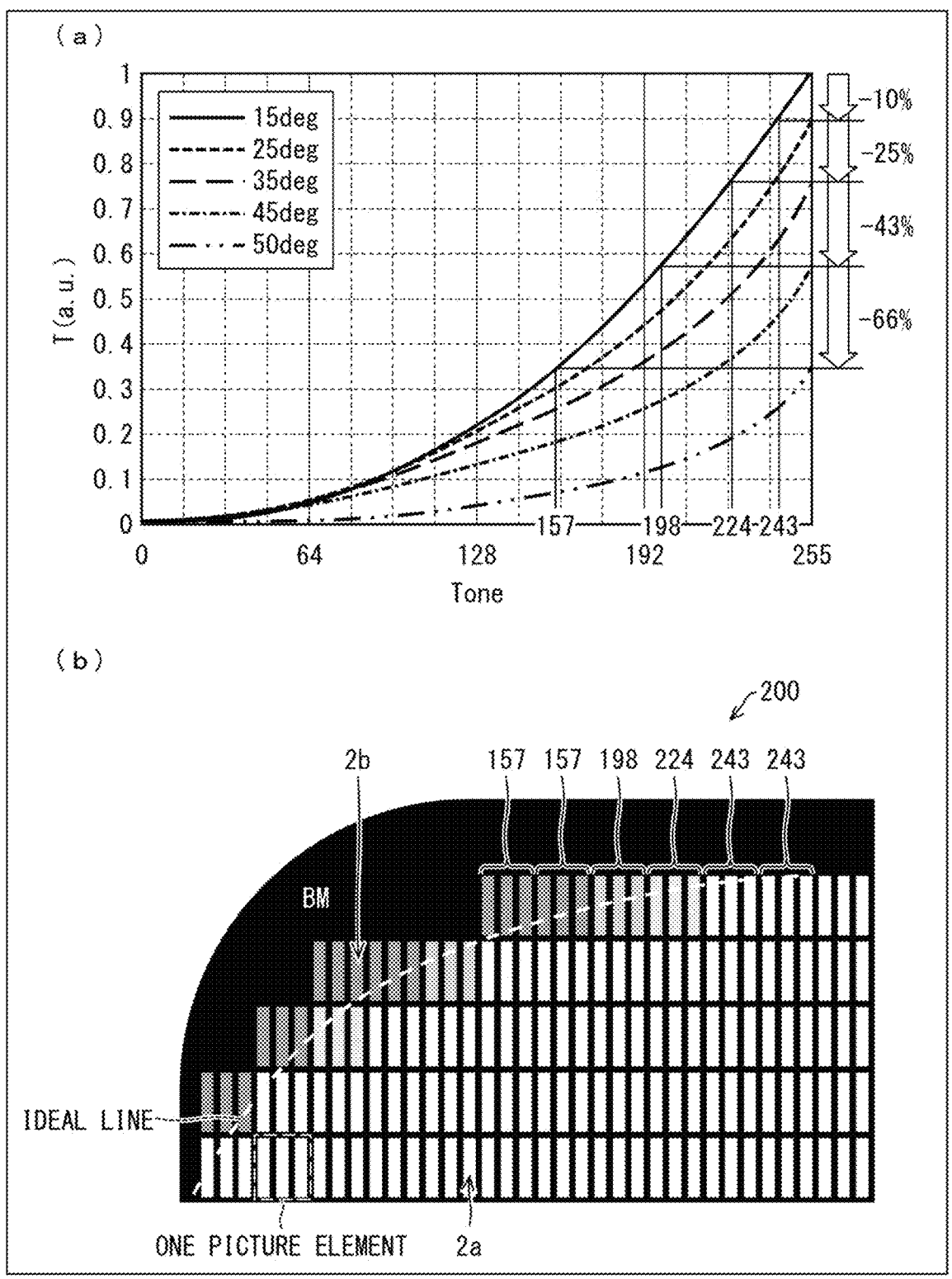

(a) of FIG. 6 is a graph showing correspondence between (i) gray levels of an image displayed by a liquid crystal display panel in accordance with Embodiment 2 and (ii) the transmittance of the picture element. (b) of FIG. 6 is a view illustrating design of the transmittance of the picture element in the liquid crystal display panel.

Figure 7:
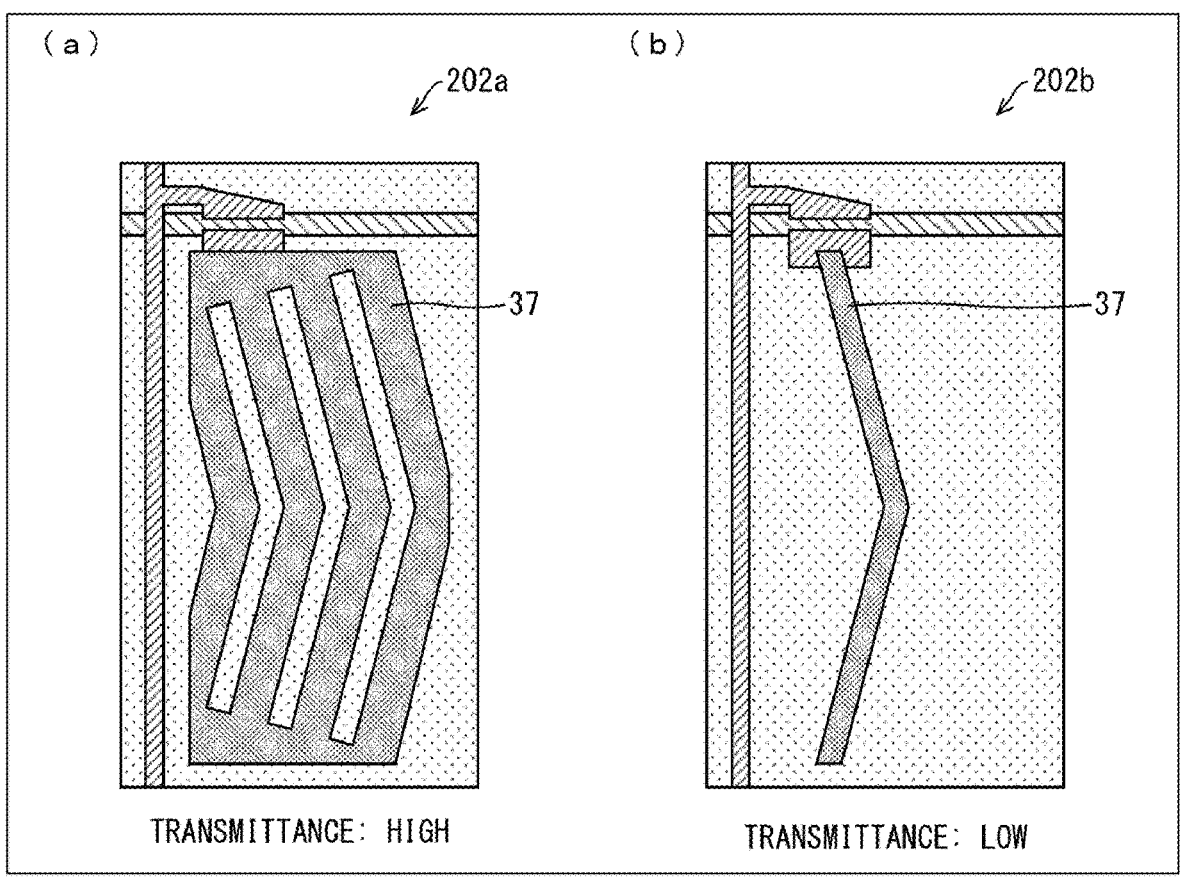

(a) and (b) of FIG. 7 are views each illustrating a configuration of a liquid crystal pixel in accordance with Embodiment 3. (a) of FIG. 7 illustrates a liquid crystal pixel which includes a larger number of electrodes and which has a higher transmittance. (b) of FIG. 7 illustrates a liquid crystal pixel which includes a smaller number of electrodes and which has a lower transmittance.

Figure 8:
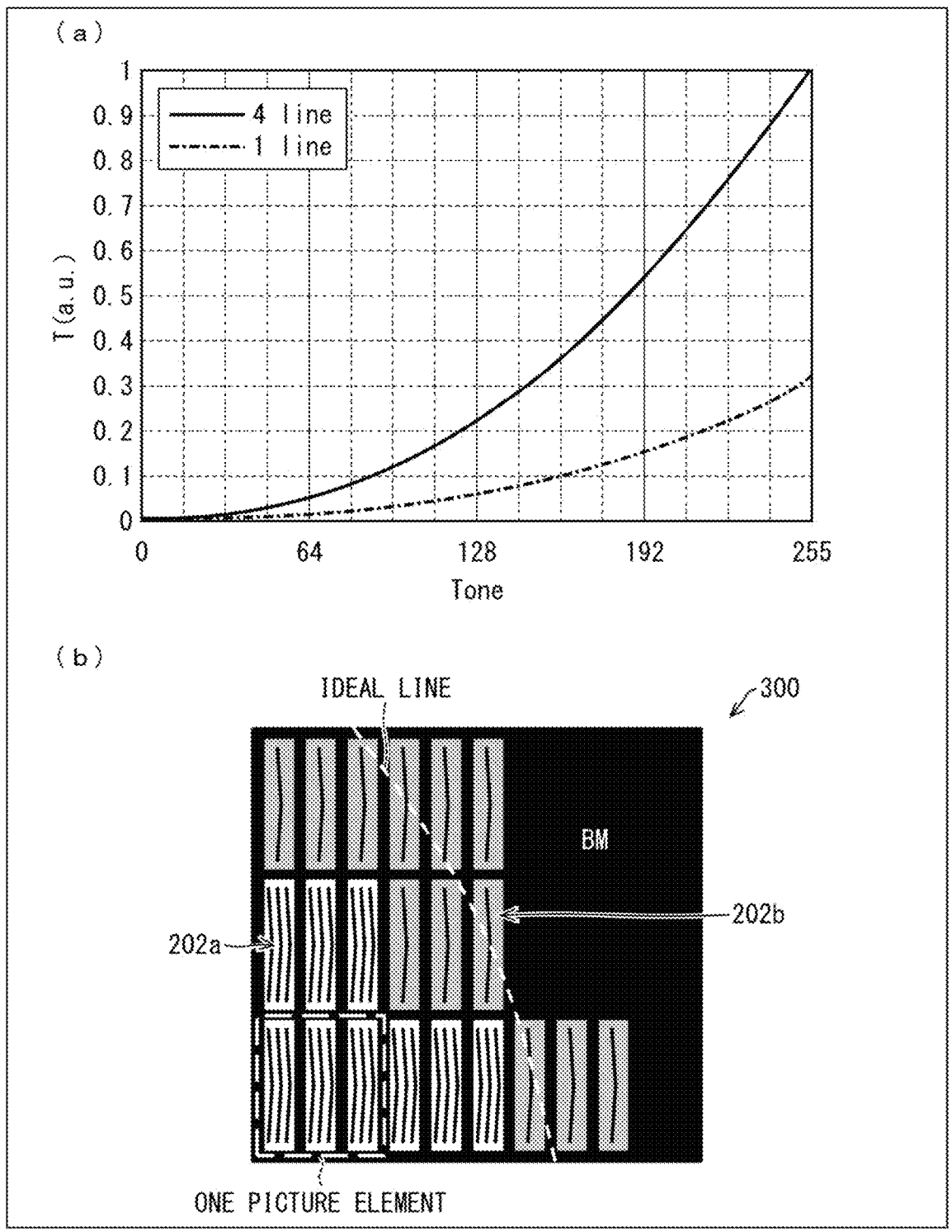

(a) of FIG. 8 is a graph showing correspondence between (i) gray levels of an image displayed by a liquid crystal display panel in accordance with Embodiment 3 and (ii) a transmittance of a picture element. (b) of FIG. 8 is a view illustrating disposition of liquid crystal pixels in the liquid crystal display panel.

Figure 9:
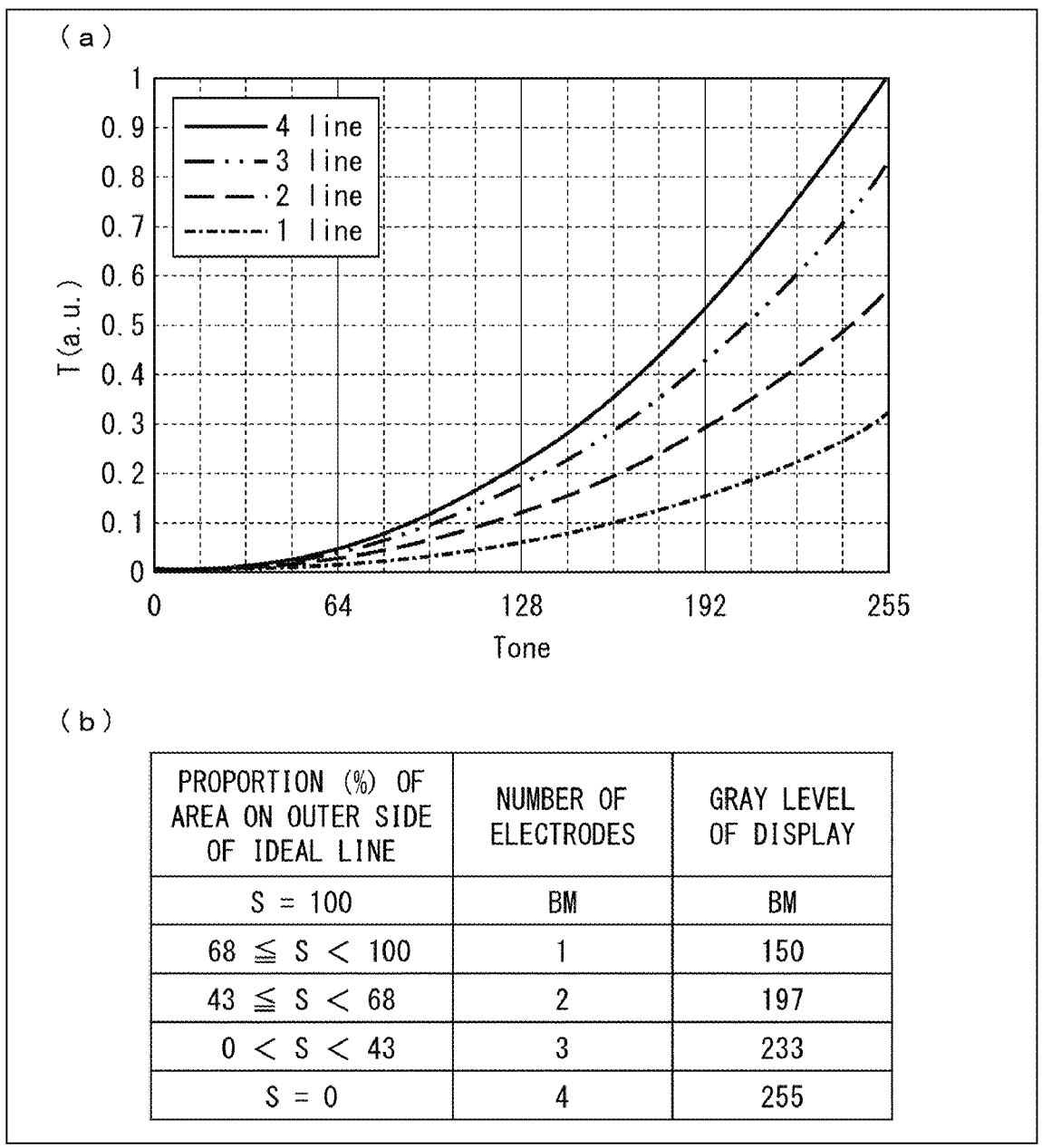

(a) of FIG. 9 is a graph showing correspondence between (i) gray levels of an image displayed by a liquid crystal display panel in accordance with Embodiment 4 and (ii) a transmittance of a picture element. (b) of FIG. 9 is a table showing correspondence between (i) an area of a region of the picture element which region is located on an outer side of an ideal line, (ii) the number of pixel electrodes included in a liquid crystal pixel which constitutes the picture element, and (iii) the transmittance of the picture element.

Figure 10:
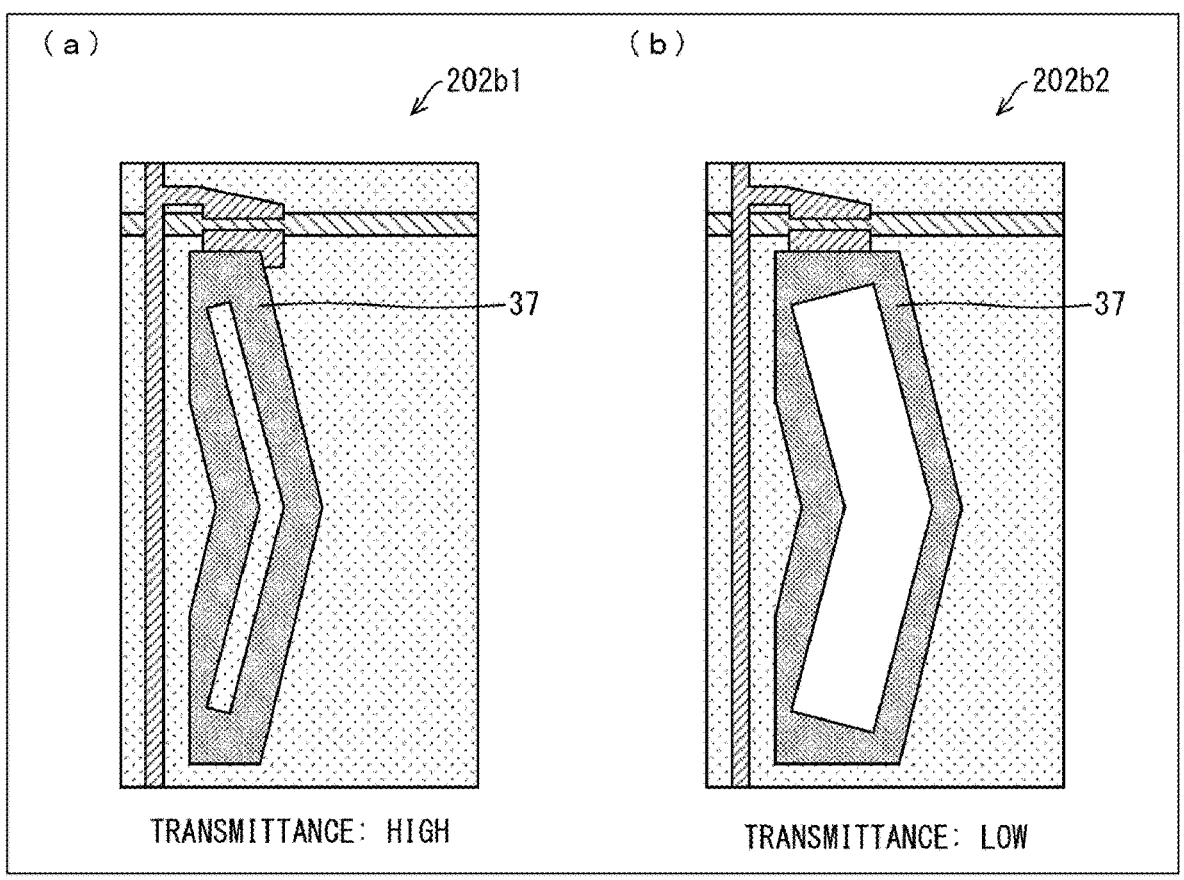

(a) and (b) of FIG. 10 are views each illustrating a configuration of a liquid crystal pixel in accordance with Embodiment 5. (a) of FIG. 10 illustrates a liquid crystal pixel which includes two electrodes that are located close to each other and which has a higher transmittance. (b) of FIG. 10 illustrates a liquid crystal pixel which includes two electrodes that are located far from each other and which has a lower transmittance.

Figure 11:
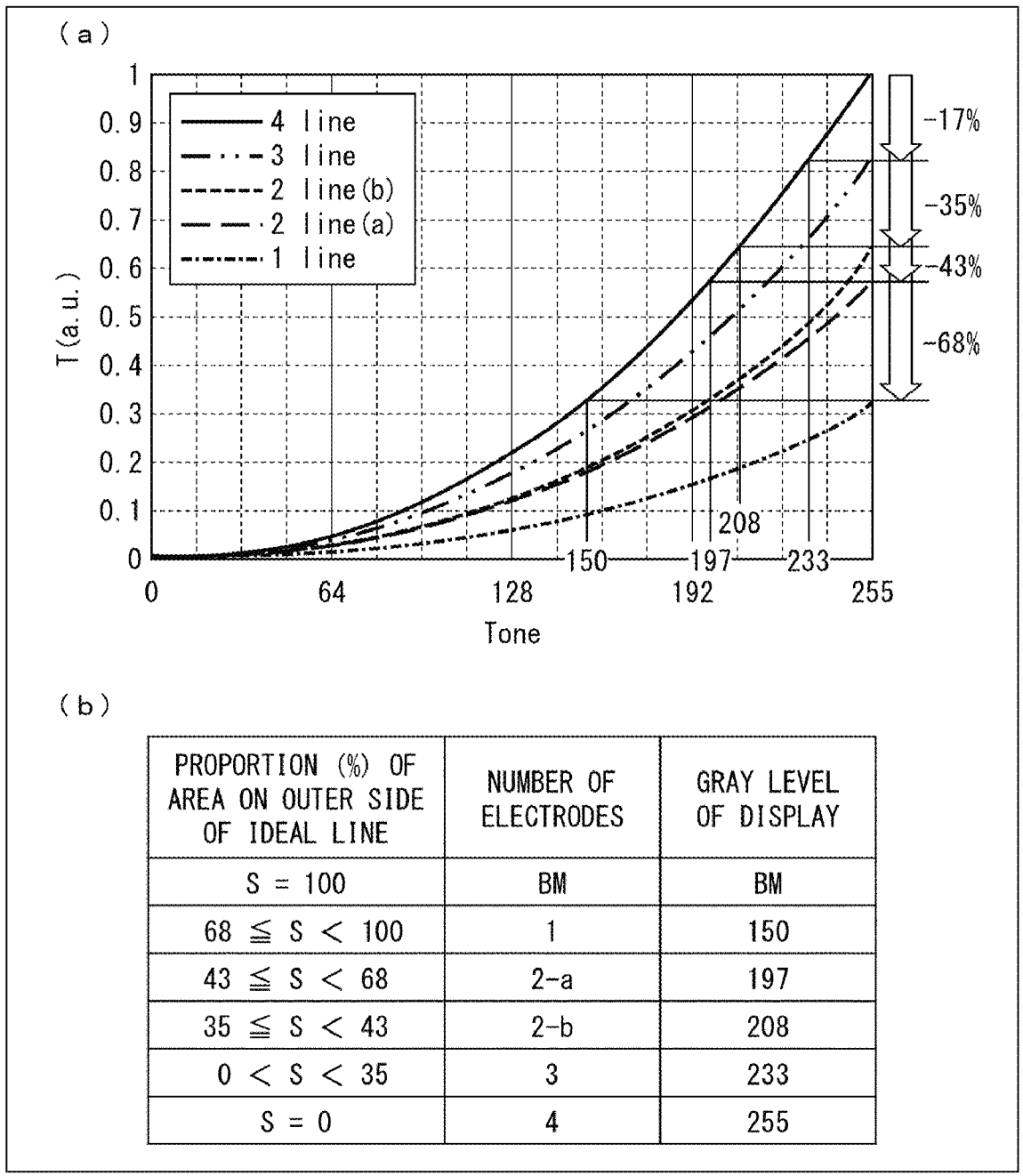

(a) of FIG. 11 is a graph showing correspondence between (i) gray levels of an image displayed by a liquid crystal display panel in accordance with Embodiment 5 and (ii) a transmittance of a picture element. (b) of FIG. 11 is a table showing correspondence between (i) an area of a region of the picture element which region is located on an outer side of an ideal line, (ii) the number of pixel electrodes included in a liquid crystal pixel which constitutes the picture element, and (iii) the transmittance of the picture element.

Figure 12:
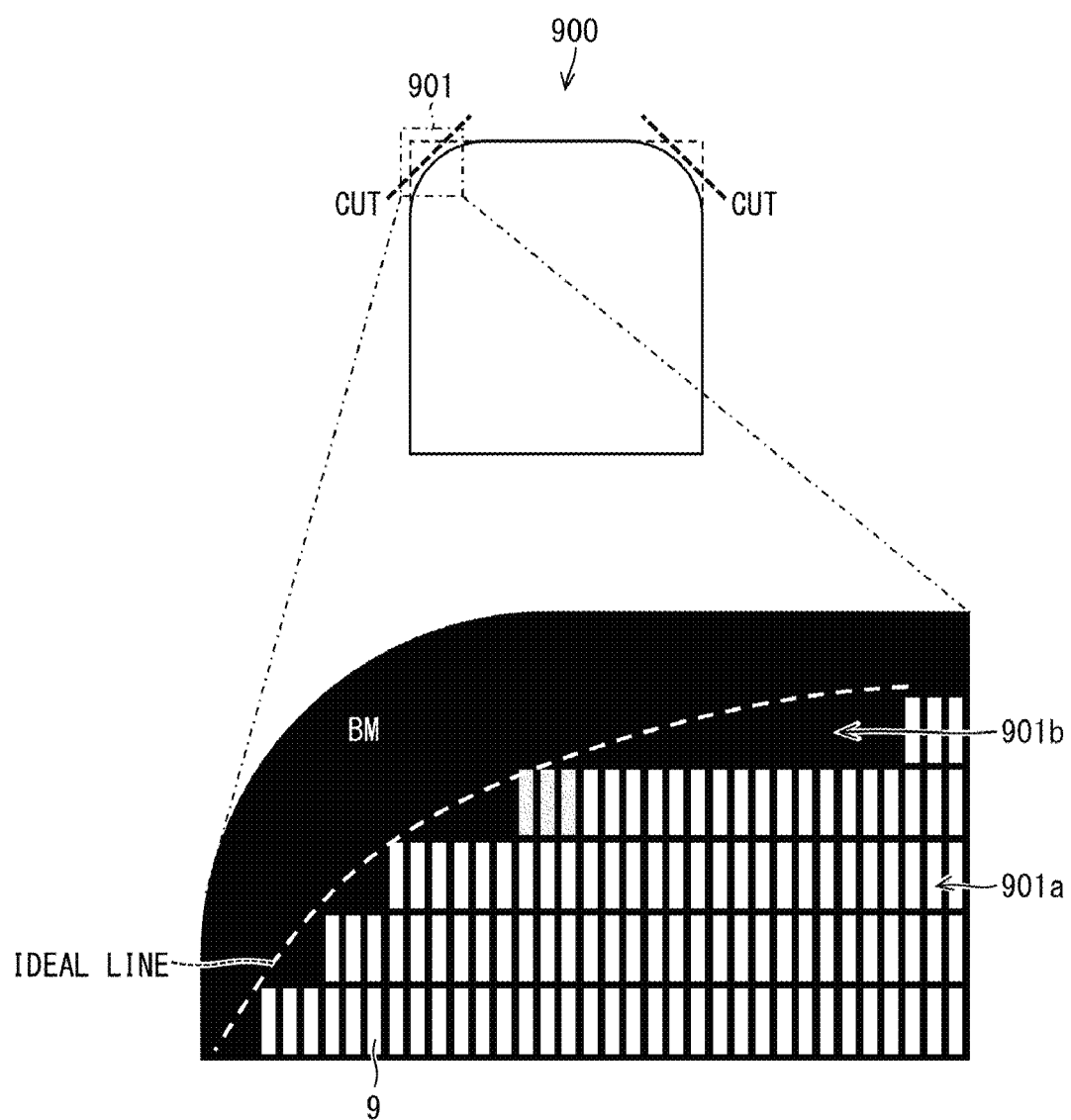

FIG. 12 is a view illustrating a configuration of a conventional liquid crystal display panel.

DESCRIPTION OF EMBODIMENTS

Embodiment 1

The following description will discuss an embodiment of the present invention with reference to FIGS. 1 through 4.

(Configuration of Liquid Crystal Display Panel 100)

Figure 1:
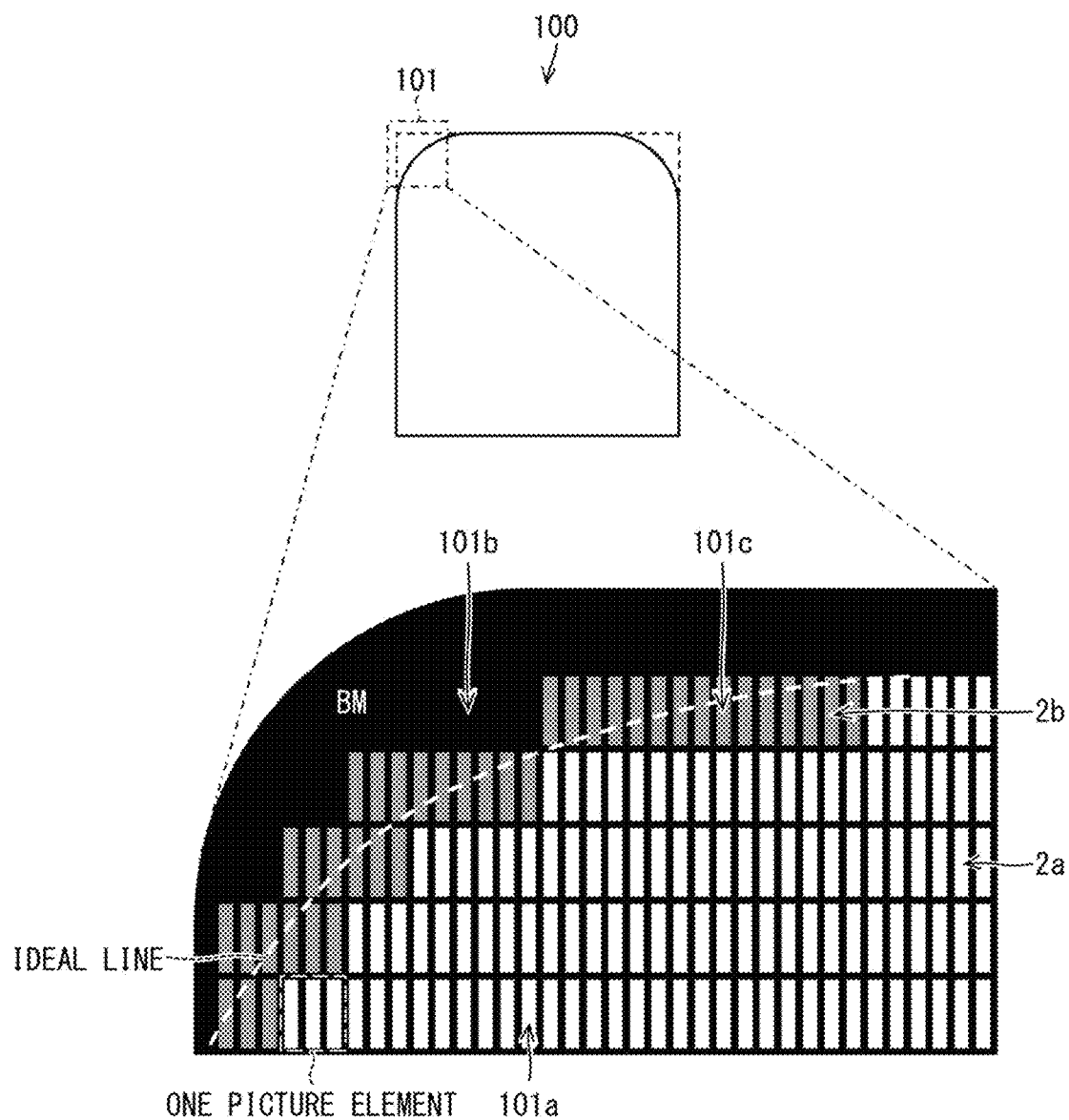
FIG. 1 is a view illustrating a configuration of a liquid crystal display panel in accordance with Embodiment 1.

A configuration of a liquid crystal display panel 100 in accordance with Embodiment 1 will be described with reference to FIG. 1. FIG. 1 is a view illustrating the configuration of the liquid crystal display panel 100. As illustrated in FIG. 1, the liquid crystal display panel 100 has an edge 101 having a rounded shape. The liquid crystal display panel 100 is produced, for example, as follows. That is, a rectangular liquid crystal display panel is first produced by a well-known production method. Next, a light blocking part (black matrix (BM)) is formed in a corner of the rectangular liquid crystal display panel thus produced. The light blocking part is formed on an outer side of an ideal line (see FIG. 1) so that the light blocking part does not cross the ideal line. The light blocking part can be made of, for example, a black resist resin. Thereafter, the corner of the rectangular liquid crystal display panel is cut. As a result, the edge 101, having a rounded outer shape, of the liquid crystal display panel 100 is formed.

As illustrated in FIG. 1, the liquid crystal display panel 100 includes, in the edge 101, a normal display region 101a, a light blocking part 101b, and a boundary display region 101c. In the normal display region 101a, liquid crystal pixels 2a are arranged. In a case where white light emitted from a backlight (not illustrated) passes through the liquid crystal pixels 2a, colors are displayed in the normal display region 101a. Meanwhile, the light blocking part 101b does not transmit the white light emitted from the backlight. In the boundary display region 102c provided between the normal display region 101a and the light blocking part 101b, liquid crystal pixels 2b are arranged along the ideal line illustrated in FIG. 1. Three adjacent liquid crystal pixels 2a, 2b correspond to respective three colors, that is, RGB, and constitute one picture element. That is, one picture element is constituted by a set of three liquid crystal pixels 2a, 2b which are necessary to carry out full color display. According to the liquid crystal display panel 100, the normal display region 101a and the boundary display region 102c correspond to a display region, that is, a region in which an image is displayed.

The liquid crystal pixels 2b in the boundary display region 102c are designed so that a transmittance of each of the liquid crystal pixels 2b is lower than that of a corresponding one(s) of the liquid crystal pixels 2a in the normal display region 101a. In a case where the liquid crystal display panel 100 does not carry out black display, an amount of light passing through each of the liquid crystal pixels 2b in the boundary display region 102c is smaller than that of light passing through a corresponding one(s) of the liquid crystal pixels 2a in the normal display region 101a. The transmittance of each of the liquid crystal pixels 2a and 2b varies depending on a corresponding one of gray levels of an image. More accurately, in a case where gray levels of an image displayed in the normal display region 101a are identical to those of an image displayed in the boundary display region 101c, the transmittance of each of the liquid crystal pixels 2b in the boundary display region 102c is lower than the transmittance of each of the liquid crystal pixels 2a in the normal display region 101a and is higher than 0 (that is, higher than a transmittance of the light blocking part 101b). Therefore, in a case where the liquid crystal display panel 100 does not carry out black display, the boundary display region 102c is darker than the normal display region 101a as illustrated in FIG. 1.

According to the configuration in accordance with Embodiment 1, a contrast in brightness between the normal display region 101a and the light blocking part 101b is reduced by the boundary display region 101c, which is darker than the normal display region 101a. Therefore, a contour of the display region is less noticeable.

(Example Structure of Liquid Crystal Pixel)

An example structure of each of the liquid crystal pixels 2a and 2b included in the liquid crystal display panel 100 will be described with reference to (a) and (b) of FIG. 2. (a) of FIG. 2 illustrates an example structure of a liquid crystal pixel 1 in an IPS mode (In-Plane Switching mode). (b) of FIG. 2 illustrates an example structure of a liquid crystal pixel 2 in an FFS (Fringe Field Switching) mode. As illustrated in (a) and (b) of FIG. 2, the liquid crystal pixel 1 and the liquid crystal pixel 2 each have a structure in which a liquid crystal is sandwiched between a pair of glass substrates.

As illustrated in (a) of FIG. 2, the liquid crystal pixel 1 in the IPS mode is configured such that a TFT (Thin Film Transistor), a pixel electrode 17, and a common electrode 18 are disposed on one of the pair of glass substrates. The TFT includes a source electrode 19, a semiconductor layer 20, and a gate electrode 21. On the other one of the pair of glass substrates, a color filter 15 is disposed. The pixel electrode 17 of the liquid crystal pixel 1 is connected to a source bus line 11. The common electrode 18 of the liquid crystal pixel 1 is connected to a gate bus line 12. Two orientation control layers 16 are disposed so that the liquid crystal is sandwiched therebetween. The two orientation control layers 16 cause a transverse electric field to be generated between the pixel electrode 17 and the common electrode 18. The transverse electric field thus generated then causes liquid crystal molecules to be driven. Orientation of the liquid crystal molecules in the liquid crystal pixel 1 is determined depending on intensity of the transverse electric field. Furthermore, a transmittance of the liquid crystal pixel 1 is also determined. In this manner, the liquid crystal pixel 1 is controlled.

As illustrated in (b) of FIG. 2, the liquid crystal pixel 2 in the FFS mode is configured such that a TFT (Thin Film Transistor), a pixel electrode 37, and a common electrode 38 are disposed on one of the pair of glass substrates. The TFT includes a source electrode 39, a semiconductor layer 40, and a gate electrode 41. The pixel electrode 37 of the liquid crystal pixel 2 is connected to a source bus line 31. The common electrode 38 of the liquid crystal pixel 2 is connected to a gate bus line 32. Two orientation control layers 36 are disposed so that the liquid crystal is sandwiched therebetween. In the liquid crystal pixel 2, the pixel electrode 37 and the common electrode 38 are disposed alongside in a longitudinal direction. The two orientation control layers 36 cause an electric field to act between the pixel electrode 37 and the common electrode 38. This causes a fringe field to be generated at an oblique angle between the pixel electrode 37 and the common electrode 38. The fringe field thus generated causes liquid crystal molecules to be driven. Orientation of the liquid crystal molecules in the liquid crystal pixel 2 is determined depending on intensity of the fringe field. Furthermore, a transmittance of the liquid crystal pixel 2 is also determined. In this manner, the liquid crystal pixel 2 is controlled. Note that a case where each of the liquid crystal pixels 2*a* and 2*b* is a liquid crystal pixel in the FFS mode will be described below, but each of the liquid crystal pixels 2*a* and 2*b* can be alternatively a liquid crystal pixel in the IPS mode in Embodiment 1 and subsequent Embodiments.

(Configuration of Liquid Crystal Pixel)

A configuration of each of the liquid crystal pixels 2*a* and 2*b* included in the liquid crystal display panel 100 will be described with reference to (a) and (b) of FIG. 3. A liquid crystal pixel 2*a* illustrated in (a) of FIG. 3 and a liquid crystal pixel 2*b* illustrated in (b) of FIG. 3 are each a liquid crystal pixel in the FFS mode as described above. In each of the liquid crystal pixel 2*a* and the liquid crystal pixel 2*b*, a pixel electrode 37 is formed in a comb-teeth pattern. The liquid crystal pixel 2*a* illustrated in (a) of FIG. 3 is designed so that an angle of the pixel electrode 37 is narrower so that a transmittance is higher. The liquid crystal pixel 2*b* illustrated in (b) of FIG. 3 is designed so that an angle of the pixel electrode 37 is wider than an optimum angle of the pixel electrode 37 included in the liquid crystal pixel 2*a* so that a transmittance is lower.

According to the liquid crystal pixel 2*a* illustrated in (a) of FIG. 3, the angle of the pixel electrode 37 is approximately 5 degrees relative to a longitudinal direction of the liquid crystal pixel 2*a*. According to the liquid crystal pixel 2*b* illustrated in (b) of FIG. 3, the angle of the pixel electrode 37 is approximately 50 degrees relative to a longitudinal direction of the liquid crystal pixel 2*b*. Therefore, a transmittance of the liquid crystal pixel 2*b*, which is designed so that the angle of the pixel electrode 37 is wider, is lower than that of the liquid crystal pixel 2*a*, which is designed so that the angle of the pixel electrode 37 is narrower and which is optimized so as to have the highest transmittance.

(Method of Disposing and Controlling Liquid Crystal Pixels)

How to dispose and control the liquid crystal pixels 2*a* and 2*b* included in the liquid crystal display panel 100 will be described with reference to (a) and (b) of FIG. 4. (a) of FIG. 4 is a graph showing correspondence between (i) gray levels of an image displayed by the liquid crystal display panel 100 and (ii) the transmittance of each of the liquid crystal pixels 2*a* and 2*b* (a case where a gamma value is 2.2). (b) of FIG. 4 is a view illustrating disposition of the liquid crystal pixels 2*a* and 2*b* in the liquid crystal display panel 100.

The transmittance of each of the liquid crystal pixels 2*a* and 2*b* is controlled depending on a corresponding one of gray levels of an image in accordance with the correspondence shown in (a) of FIG. 4. As shown in (a) of FIG. 4, a graph labeled "5 deg", which graph corresponds to the liquid crystal pixel 2*a*, is different from a graph labeled "50 deg", which graph corresponds to the liquid crystal pixel 2*b*. That is, the transmittance, corresponding to a certain gray level (except for a case where the certain gray level is 0 (zero)), of the liquid crystal pixel 2*a*, which is designed so that the angle of the pixel electrode 37 is narrower, is different from the transmittance, corresponding to an identical gray level, of the liquid crystal pixel 2*b*, which is designed so that the angle of the pixel electrode 37 is wider. In particular, a difference in transmittance corresponding to a maximum gray level (255) is the greatest. According to (a) of FIG. 4, the transmittance, corresponding to the maximum gray level, of the liquid crystal pixel 2*a* is 1 (one) (see the graph labeled "5 deg"). Meanwhile, the transmittance, corresponding to the maximum gray level, of the liquid crystal pixel 2*b* is approximately 0.3 (see the graph labeled "50 deg"). Therefore, in a case where the liquid crystal display panel 100 carries out white display, the difference in transmittance between the liquid crystal pixel 2*a* and the liquid crystal pixel 2*b* is approximately 0.7. In other words, a range of the transmittance of the liquid crystal pixel 2*b* is narrower, by approximately 70%, than that of the transmittance of the liquid crystal pixel 2*a*. Therefore, in a case where the liquid crystal display panel 100 does not carry out black display, the liquid crystal pixel 2*b* is darker than the liquid crystal pixel 2*a*.

As illustrated in (b) of FIG. 4, according to the liquid crystal display panel 100, three liquid crystal pixels 2*a*, 2*b* corresponding to respective three colors, that is, RGB constitute one set (one picture element). The transmittance of each of the liquid crystal pixels 2*a* and 2*b* is controlled on the basis of a corresponding one of picture elements. The liquid crystal pixels 2*a*, each of which is designed so that the angle of the pixel electrode 37 is narrower, are arranged on an inner side of the ideal line, that is, within the above-described normal display region 101*a*. The black matrix (BM) is formed on the outer side of the ideal line, that is, within the above-described light blocking part 101*b*. Within the boundary display region 102*c* provided between the normal display region 101*a* and the light blocking part 101*b*, the liquid crystal pixels 2*b*, each of which is designed so that the angle of the pixel electrode 37 is wider, are arranged. Picture elements constituted by the liquid crystal pixels 2*b* are arranged at respective positions overlapping the ideal line.

According to the liquid crystal display panel 100, the transmittance of each of the liquid crystal pixels 2*a* and 2*b* is controlled on the basis of a corresponding one of the picture elements. Therefore, three liquid crystal pixels 2*a*, 2*b* which constitute one picture element are equal in transmittance. Accordingly, it is possible to prevent an unintended color (that is, color which does not correspond to an image) from being displayed in the boundary display region 101c.

Embodiment 2

The following description will discuss another embodiment of the present invention with reference to FIGS. 5 and 6. Note that, for convenience, an identical reference numeral will be given to a member having a function identical to that of a member described in the foregoing embodiment, and description of the member will be omitted.

In Embodiment 1, a configuration has been described in which respective transmittances of all picture elements located so as to overlap an ideal line are decreased at an identical rate. In Embodiment 2, a configuration will be described in which a transmittance of each of liquid crystal pixels 2b is more finely designed depending on an area S of a region of a corresponding one of picture elements which region is located on an outer side of an ideal line.

(Method of Disposing and Controlling Liquid Crystal Pixels)

Design of the transmittance of each of the liquid crystal pixels 2b in accordance with Embodiment 2 will be described with reference to (a) and (b) of FIG. 5. (a) of FIG. 5 is a table showing, in regard to a picture element constituted by three liquid crystal pixels 2b, correspondence between (i) an area S (proportion) of a region of the picture element which region is located on an outer side of an ideal line, (ii) an angle (design value) of a pixel electrode 37 included in a liquid crystal pixel 2b, and (iii) a transmittance (converted into a gray level) of the liquid crystal pixel 2b. (b) of FIG. 5 shows the area S of the region of the picture element which region is located on the outer side of the ideal line.

As shown in (a) of FIG. 5, in Embodiment 2, the transmittance of the liquid crystal pixel 2b is classified into a plurality of levels depending on the above-described area S. Specifically, the transmittance of the liquid crystal pixel 2b is designed by the angle of the pixel electrode 37 included in the liquid crystal pixel 2b. The angle of the pixel electrode 37 included in the liquid crystal pixel 2b is any one of 15 degrees, 25 degrees, 35 degrees, 45 degrees, and 50 degrees. For example, in a case where the area S is not less than 66% and less than 100%, the angle of the pixel electrode 37 included in the liquid crystal pixel 2b constituting the picture element is designed so as to be 50 degrees. In this case, in a case where a maximum transmittance of the liquid crystal pixel 2b constituting the picture element is converted into a gray level corresponding to an identical transmittance of a liquid crystal pixel 2a, the maximum transmittance of the liquid crystal pixel 2b is 157. That is, brightness of the liquid crystal pixel 2b in a case where a gray level of an image has a maximum value (255) is equal to brightness of the liquid crystal pixel 2a in a case where a gray level of an image is 157.

How to dispose and control the transmittance of each of the liquid crystal pixels 2b included in the liquid crystal display panel 200 in accordance with Embodiment 2 will be described with reference to (a) and (b) of FIG. 6. (a) of FIG. 6 is a graph showing correspondence between (i) gray levels of an image displayed by the liquid crystal display panel 200 and (ii) the transmittance of the liquid crystal pixel 2b. (b) of FIG. 6 is a view illustrating disposition of liquid crystal pixels 2a and the liquid crystal pixels 2b in the liquid crystal display panel 200.

As shown in (a) of FIG. 6, according to Embodiment 2, the correspondence between the gray levels of the image and the transmittance of the liquid crystal pixel 2b varies depending on whether the angle of the pixel electrode 37 included in the liquid crystal pixel 2b is 15 degrees, 25 degrees, 35 degrees, 45 degrees, or 50 degrees. As the angle of the pixel electrode 37 included in the liquid crystal pixel 2b becomes wider, the transmittance, corresponding to an identical gray level, of the liquid crystal pixel 2b becomes lower (except for a case where a gray level is 0 (zero)). For example, as shown in (a) of FIG. 6, in a case where the angle of the pixel electrode 37 is 15 degrees, the transmittance, corresponding to a gray level having a maximum value (255), of the liquid crystal pixel 2b is 1 (one). In a case where the angle of the pixel electrode 37 is 50 degrees, the transmittance, corresponding to an identical gray level (255), of the liquid crystal pixel 2b is approximately 0.35. In other words, as the angle of the pixel electrode 37 becomes wider, a range of the transmittance of the liquid crystal pixel 2b becomes narrower.

As illustrated in (b) of FIG. 6, according to the liquid crystal display panel 200, brightness of the liquid crystal pixel 2b varies depending on the above-described area S. As the area S becomes larger (that is, the region of the picture element which region is located on the outer side of the ideal line becomes larger), the transmittance, corresponding to an identical gray level, of the liquid crystal pixel 2b becomes lower. For example, in a case where the liquid crystal display panel 200 carries out white display, transmittances of the liquid crystal pixels 2b which include respective pixel electrodes 37 whose angles are 15 degrees, 25 degrees, 35 degrees, 45 degrees, and 50 degrees, respectively are 1, 0.90, 0.75, 0.57, and 0.33, respectively. In other words, in a case where the liquid crystal display panel 200 carries out white display, the transmittances of the liquid crystal pixels 2b which include the respective pixel electrodes 37 whose angles are 25 degrees, 35 degrees, 45 degrees, and 50 degrees, respectively are lower by 10%, 25%, 43%, and 67%, respectively, than the transmittance of the liquid crystal pixel 2b which includes the pixel electrode 37 whose angle is 15 degrees.

According to the configuration in accordance with Embodiment 2, since the transmittance of each of the liquid crystal pixels 2b in a boundary display region 101c is designed, depending on the area S, so as to be classified into the plurality of levels, a contour of a normal display region 101a is less noticeable. Therefore, a contour of a display region is visually recognized as if the contour were smooth.

Embodiment 3

The following description will discuss another embodiment of the present invention with reference to FIGS. 7 and 8. Note that, for convenience, an identical reference numeral will be given to a member having a function identical to that of a member described in the foregoing embodiments, and description of the member will be omitted.

In Embodiments 1 and 2, a configuration has been described in which a transmittance of each of liquid crystal pixels 2a and 2b is designed on the basis of an angle of a pixel electrode 37 included in the each of the liquid crystal pixels 2a and 2b. In Embodiment 3, a configuration will be described in which a transmittance of each of liquid crystal pixels 2a and 2b is designed on the basis of the number of pixel electrodes 37 included in the each of the liquid crystal pixels 202a and 202b.

(Configuration of Liquid Crystal Pixel)

Design of each of the liquid crystal pixels 202a and 202b in accordance with Embodiment 3 will be described with reference to (a) and (b) of FIG. 7. (a) of FIG. 7 is a view illustrating a configuration of a liquid crystal pixel 202a. (b) of FIG. 7 is a view illustrating a configuration of a liquid crystal pixel 202b. The liquid crystal pixel 202a illustrated in (a) of FIG. 7 and the liquid crystal pixel 202b illustrated in (b) of FIG. 7 each correspond to a liquid crystal pixel 2 which is in an FFS mode and which has been described in Embodiment 1 (see (b) of FIG. 2). The liquid crystal pixel 202a and the liquid crystal pixel 202b are different from each other in the number of pixel electrodes 37. The liquid crystal pixel 202a illustrated in (a) of FIG. 7 has four pixel electrodes 37. The liquid crystal pixel 202b illustrated in (b) of FIG. 7 has one pixel electrode 37.

As the number of pixel electrodes 37 is increased, an electric field which the pixel electrodes 37 cause to act on liquid crystal becomes more intense. As the electric field acting on the liquid crystal becomes more intense, orientation of liquid crystal molecules becomes more uniform. Therefore, a transmittance of the liquid crystal pixel 202b, which includes a smaller number of pixel electrodes 37, is lower than that of the liquid crystal pixel 202a, which includes a larger number of pixel electrodes 37.

(Method of Disposing and Controlling Liquid Crystal Pixels)

How to dispose and control the liquid crystal pixels 202a and 202b in accordance with Embodiment 3 will be described with reference to (a) and (b) of FIG. 8. (a) of FIG. 8 is a graph showing correspondence between (i) gray levels of an image and (ii) the transmittance of each of the liquid crystal pixels 202a and 202b. (b) of FIG. 8 is a view illustrating disposition of the liquid crystal pixels 202a and 202b in the liquid crystal display panel 300 in accordance with Embodiment 3.

As shown in (a) of FIG. 8, a graph which corresponds to the liquid crystal pixel 202a (graph labeled "4 line" in (a) of FIG. 8) is different from a graph which corresponds to the liquid crystal pixel 202b (graph labeled "1 line" in (a) of FIG. 8). As illustrated in (a) of FIG. 8, the transmittance, corresponding to a maximum gray level (255), of the liquid crystal pixel 202a is 1 (one), and the transmittance, corresponding to an identical gray level (255), of the liquid crystal pixel 202b is approximately 0.3. Therefore, a difference in transmittance is approximately 0.7. That is, a range of the transmittance of the liquid crystal pixel 202b is narrower than that of the transmittance of the liquid crystal pixel 202a.

As illustrated in (b) of FIG. 8, the liquid crystal pixels 202a, each of which includes four pixel electrodes 37, are arranged on an inner side of an ideal line, that is, within the above-described normal display region 101a. On the ideal line, that is, within a boundary display region 101c provided on a boundary between the normal display region 101a and a light blocking part 101b, the liquid crystal pixels 202b, each of which includes one pixel electrode 37, are arranged. As has been described, the transmittance of each of the liquid crystal pixels 202b is lower than that of a corresponding one(s) of the liquid crystal pixels 202a. Therefore, in a case where the liquid crystal display panel 300 does not carry out black display, the boundary display region 102c is brighter than the light blocking part 101b, which is constituted by a black matrix, and is darker than the normal display region 101a. According to the liquid crystal display panel 300, the boundary display region 102c is sandwiched between the normal display region 101a and the light blocking part 101b. Therefore, a contour of a display region is less noticeable, as compared to a configuration in which the normal display region 101a is directly adjacent to the light blocking part 101b.

Furthermore, according to the liquid crystal display panel 300, three liquid crystal pixels 202a, 202b corresponding to respective three colors, that is, RGB constitute one set (one picture element). The transmittance of each of the liquid crystal pixels 202a and 202b is controlled on the basis of a corresponding one of picture elements. Accordingly, it is possible to prevent an unintended color (that is, color which does not correspond to an image signal) from being displayed in the boundary display region 101c, as compared to a configuration in which the transmittance of each of the liquid crystal pixels 202a and 202b is controlled on the basis of the each of the liquid crystal pixels 202a and 202b. Note that, in Embodiment 3 and subsequent Embodiments, each of the liquid crystal pixels 202a and 202b can be alternatively a liquid crystal pixel in an IPS mode.

Embodiment 4

The following description will discuss another embodiment of the present invention with reference to FIG. 9. Note that, for convenience, an identical reference numeral will be given to a member having a function identical to that of a member described in the foregoing embodiments, and description of the member will be omitted.

In Embodiment 4, a configuration will be described in which, in a liquid crystal display panel 300 (see (b) of FIG. 8) described in Embodiment 3, a transmittance of each of liquid crystal pixels 202b is more finely designed depending on an area S of a region of a corresponding one of picture elements which region is located on an outer side of an ideal line.

(Method of Disposing and Controlling Liquid Crystal Pixels)

How to control the transmittance of each of the liquid crystal pixels 202b in accordance with Embodiment 4 will be described with reference to (a) and (b) of FIG. 9. (a) of FIG. 9 is a graph showing correspondence between (i) gray levels of an image and (ii) a transmittance of a liquid crystal pixel 202b. (b) of FIG. 9 is a table showing correspondence between (i) an area S (proportion) of a region of a picture element which region is located on the outer side of the ideal line, (ii) the number (design value) of pixel electrodes 37 included in a liquid crystal pixel 2b, and (iii) a transmittance (converted into a gray level) of the liquid crystal pixel 202b.

As shown in (a) of FIG. 9, according to Embodiment 4, the correspondence between (i) the gray levels of the image and (ii) the transmittance of the liquid crystal pixel 202b varies depending on whether the number of pixel electrodes 37 included in the liquid crystal pixel 202b is 1, 2, 3, or 4. As the number of pixel electrodes 37 included in the liquid crystal pixel 202b is decreased, the transmittance of the liquid crystal pixel 202b becomes lower. For example, as shown in (a) of FIG. 9, in a case where the number of pixel electrodes 37 is 4, the transmittance, corresponding to a gray level having a maximum value (255), of the liquid crystal pixel 202b is 1 (one). In a case where the number of pixel electrodes 37 is 1 (one), the transmittance, corresponding to an identical gray level (255), of the liquid crystal pixel 202b is approximately 0.33. That is, as the number of pixel electrodes 37 included in the liquid crystal pixel 202b is decreased, a range of the transmittance of the liquid crystal pixel 202b becomes narrower.

As shown in (b) of FIG. 9, in Embodiment 4, the transmittance of the liquid crystal pixel 202b is classified into a plurality of levels depending on the above-described area S. For example, in a case where the area S of the region of the picture element which region is located on the outer side of the ideal line is not less than 66% and less than 100%, the number of pixel electrodes 37 included in the liquid crystal pixel 202$b$ constituting the picture element is designed so as to be 1 (one). In this case, in a case where a maximum transmittance of the liquid crystal pixel 202$b$ constituting the picture element is converted into a gray level corresponding to an identical transmittance of a liquid crystal pixel 202$a$, the maximum transmittance of the liquid crystal pixel 202$b$ is 150. In other words, brightness of the liquid crystal pixel 202$b$ in a case where a gray level of an image has a maximum value (255) is equal to brightness of the liquid crystal pixel 202$a$ in a case where a gray level of an image is 150.

According to the configuration in accordance with Embodiment 4, since the transmittance of each of the liquid crystal pixels 202$b$ in a boundary display region 102$c$ is finely designed depending on the area S, a contour of a normal display region 101$a$ is less noticeable. Therefore, a contour of the normal display region 101$a$ is visually recognized as if the contour were smooth.

Embodiment 5

The following description will discuss another embodiment of the present invention with reference to FIGS. 10 and 11. Note that, for convenience, an identical reference numeral will be given to a member having a function identical to that of a member described in the foregoing embodiments, and description of the member will be omitted.

In Embodiment 4, a configuration has been described in which a transmittance of each of liquid crystal pixels 202$b$ is controlled on the basis of the number of pixel electrodes 37 included in the each of the liquid crystal pixels 202$b$. In Embodiment 5, a configuration will be described in which, in a configuration described in Embodiment 4, a transmittance of each of liquid crystal pixels 202$b$ is more finely controlled on the basis of disposition of a pixel electrode 37 in the each of the liquid crystal pixels 202$b$.

(Configuration of Liquid Crystal Pixel)

A configuration of each of liquid crystal pixels 202$b$1 and 202$b$2 in accordance with Embodiment 5 will be described with reference to (a) and (b) of FIG. 10. (a) of FIG. 10 is a view illustrating a configuration of a liquid crystal pixel 202$b$1. (b) of FIG. 10 is a view illustrating a configuration of a liquid crystal pixel 202$b$2. The liquid crystal pixel 202$b$1 and the liquid crystal pixel 202$b$2 in accordance with Embodiment 5 each correspond to a liquid crystal pixel 202$b$ which includes two pixel electrodes 37 and which has been described in Embodiment 4. The liquid crystal pixel 202$b$1 illustrated in (b) of FIG. 10 is designed so that a transmittance is higher. The liquid crystal pixel 202$b$2 illustrated in (b) of FIG. 10 is designed so that a transmittance is lower.

According to the liquid crystal pixel 202$b$1 illustrated in (a) of FIG. 10, two pixel electrodes 37 are located close to each other. Therefore, an electric field which the two pixel electrodes 37 cause to act on liquid crystal is more intense. On the other hand, according to the liquid crystal pixel 202$b$2 illustrated in (b) of FIG. 10, two pixel electrodes 37 are located far from each other. Therefore, an electric field which the two pixel electrodes 37 cause to act on liquid crystal is weaker. As the electric field acting on the liquid crystal becomes more intense, orientation of liquid crystal molecules becomes more uniform. Therefore, the transmittance of the liquid crystal pixel 202$b$1, which is configured such that the two pixel electrodes 37 are located far from each other, is lower than that of the liquid crystal pixel 202$b$2, which is configured such that the two pixel electrodes 37 are located close to each other.

(Disposition and Control of Liquid Crystal Pixels)

How to control the transmittance of each of the liquid crystal pixels 202$b$ in accordance with Embodiment 5 will be described with reference to (a) and (b) of FIG. 11. (a) of FIG. 11 is a graph showing correspondence between (i) gray levels of an image displayed by a liquid crystal display panel 300 (see (b) of FIG. 8) and (ii) a transmittance of a liquid crystal pixel 202$b$. (b) of FIG. 11 is a table showing, in regard to a picture element constituted by three liquid crystal pixels 202$b$, correspondence between (i) an area S (proportion) of a region of the picture element which region is located on an outer side of an ideal line, (ii) the number (design value) of pixel electrodes 37 included in a liquid crystal pixel 2$b$ which constitutes the picture element, and (iii) a transmittance (converted into a gray level) of the picture element.

As shown in (a) of FIG. 11, according to Embodiment 5, the correspondence between (i) the gray levels of the image and (ii) the transmittance of the liquid crystal pixel 202$b$ varies depending on whether the number of pixel electrodes 37 included in the liquid crystal pixel 202$b$ is 1, 2, 3, or 4. Furthermore, in a case where the liquid crystal pixel 202$b$ includes two pixel electrodes 37, the correspondence between (i) the gray levels of the image and (ii) the transmittance of the liquid crystal pixel 202$b$ varies depending on a positional relationship between the two pixel electrodes 37 included in the liquid crystal pixel 202$b$, that is, depending on whether the liquid crystal pixel 202$b$ is the liquid crystal pixel 202$b$1 illustrated in (a) of FIG. 10 or the liquid crystal pixel 202$b$2 illustrated in (b) of FIG. 10. In (a) of FIG. 11, a graph corresponding to a case where the two pixel electrodes 37 are located close to each other is labeled "2 line(b)". Meanwhile, a graph corresponding to a case where the two pixel electrodes 37 are located far from each other is labeled "2line(a)".

As has been described in Embodiment 4, as the number of pixel electrodes 37 included in the liquid crystal pixel 202$b$ is decreased, the transmittance of the liquid crystal pixel 202$b$ becomes lower. Furthermore, as described above, in a case where the liquid crystal pixel 202$b$ includes two pixel electrodes 37, the transmittance of the liquid crystal pixel 202$b$ becomes higher as the two pixel electrodes 37 are located closer to each other. According to Embodiment 5, the transmittance of the liquid crystal pixel 202$b$ is designed not only by the number of pixel electrodes 37 included in the liquid crystal pixel 202$b$, but also by respective positions of the pixel electrodes 37.

As shown in (b) of FIG. 11, in Embodiment 5, the transmittance of the liquid crystal pixel 202$b$ is classified into six levels depending on the area S. Out of the six levels, five levels are distinguished by the number of pixel electrodes 37. Moreover, out of the six levels, two levels at each of which the number of pixel electrodes 37 is identical are distinguished by a positional relationship between two pixel electrodes 37. Specifically, in a case where the area S is not less than 43 and less than 68, the liquid crystal pixel 202$b$ is designed so that the two pixel electrodes 37 are located close to each other and the transmittance of the liquid crystal pixel 202$b$ is higher. In a case where the area S is not less than 35 and less than 43, the liquid crystal pixel 202$b$ is designed so that the two pixel electrodes 37 are located far from each other and the transmittance of the liquid crystal pixel 202b is lower.

According to the configuration in accordance with Embodiment 5, it is possible to more finely design, depending on the area S, the transmittance of each of the liquid crystal pixels 202b in a boundary display region 101c. Therefore, a contour of a display region is less noticeable.

[Recap]

A liquid crystal display panel (100, 200, 300) in accordance with Aspect 1 of the present invention is a liquid crystal display panel including: a display region which is constituted by liquid crystal pixels (2a, 2b, 202a, 202b, 202b1, 202b2); and a light blocking part (101b) which is black and which is provided on an outer side of the display region, the display region including (i) a boundary display region (101c) which is in contact with the light blocking part and in which first ones of the liquid crystal pixels are arranged stepwise and (ii) a normal display region (101a) which is provided on an inner side of the boundary display region, an image being displayed more darkly in the boundary display region than in the normal display region.

According to the above configuration, the display region is divided into the normal display region and the boundary display region. An image is displayed more darkly in the boundary display region, which is in contact with the light blocking part, than in the normal display region. Therefore, a contrast in brightness between the display region and the light blocking part is reduced. This consequently causes a stepwise contour of the display region not to be noticeable. Thus, it is possible to enhance a display quality of the liquid crystal display panel.

The liquid crystal display panel in accordance with Aspect 2 of the present invention can be arranged such that, in Aspect 1, second ones of the liquid crystal pixels are arranged in the normal display region; a light transmittance of each of the second ones of the liquid crystal pixels is relatively higher; and a light transmittance of each of the first ones of the liquid crystal pixels is relatively lower.

According to the above configuration, a light transmittance of each of liquid crystal pixels in the boundary display region is lower than a light transmittance of a corresponding one(s) of liquid crystal pixels in the normal display region. Therefore, it is possible to display an image more darkly in the boundary display region than in the normal display region.

The liquid crystal display panel in accordance with Aspect 3 of the present invention can be arranged such that, in Aspect 2, each of the first ones of the liquid crystal pixels includes a smaller number of electrodes than each of the second ones of the liquid crystal pixels.

According to the above configuration, each of the liquid crystal pixels in the boundary display region includes a smaller number of electrodes. Therefore, according to each of the liquid crystal pixels in the boundary display region, an electric field, for causing orientation of liquid crystal molecules to be uniform, is weaker. Accordingly, a smaller amount of light passes through each of the liquid crystal pixels in the boundary display region. Thus, the light transmittance of each of the liquid crystal pixels in the boundary display region is lower.

The liquid crystal display panel in accordance with Aspect 4 of the present invention can be arranged such that, in Aspect 2, in a case where a longitudinal direction of the liquid crystal pixels in the display region is regarded as a reference, an angle, relative to the longitudinal direction, of an electrode included in each of the first ones of the liquid crystal pixels is wider than an angle, relative to the longitudinal direction, of an electrode included in each of the second ones of the liquid crystal pixels.

According to the above configuration, an angle of each of the liquid crystal pixels in the boundary display region is wider. This causes a smaller amount of light to pass through each of the liquid crystal pixels in the boundary display region. Therefore, the light transmittance of each of the liquid crystal pixels in the boundary display region is lower.

The liquid crystal display panel in accordance with Aspect 5 of the present invention can be arranged such that, in any one of Aspects 2 through 4, three of the liquid crystal pixels, which three correspond to respective three colors of RGB, constitute one picture element; and the three of the liquid crystal pixels are equal in light transmittance.

According to the above configuration, pixels which constitute one picture element are equal in transmittance. Therefore, it is possible to prevent a color, which does not correspond to an image, from being displayed.

The liquid crystal display panel in accordance with Aspect 6 of the present invention can be arranged such that, in Aspect 5, in the boundary display region, as a proportion of a region of the one picture element which region is located on an outer side of a virtual ideal line becomes higher, the light transmittance of each of the three of the liquid crystal pixels becomes lower.

According to the above configuration, it is possible to finely design a transmittance of a picture element on the basis of a proportion of a region of the picture element which region is located on an outer side of an ideal line.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 100, 200, 300 Liquid crystal display panel
101a Normal display region (display region)
101b Light blocking part
102c Boundary display region (display region)
2a, 2b, 202a, 202b, 202b1, 202b2 Liquid crystal pixel

The invention claimed is:

1. A liquid crystal display panel comprising:
a display region which is constituted by liquid crystal pixels each having a longer dimension and a shorter dimension, the liquid crystal pixels being equal in area to each other, the longer dimensions of the respective liquid crystal pixels being parallel to each other; and
a light blocking portion which is black and which is provided on an outer side of the display region, wherein the display region includes:
(i) a boundary display region which is in contact with the light blocking portion and in which first ones of the liquid crystal pixels are arranged stepwise, and
(ii) a normal display region which is provided on an inner side of the boundary display region in which second ones of the liquid crystal pixels are arranged,
an image is displayed more darkly in the boundary display region than in the normal display region, and
in a case where a longitudinal direction of the liquid crystal pixels in the display region in which the longer dimensions of the liquid crystal pixels extend is a reference, an angle, relative to the longitudinal direction, of an electrode included in each of the first ones of the liquid crystal pixels, is wider than an angle, relative to the longitudinal direction, of an electrode included in each of the second ones of the liquid crystal pixels.

* * * * *